March 7, 1961 W. E. FOLKERTS 2,973,747
EXPANSIBLE RING SEAL VALVE
Filed Dec. 31, 1958 3 Sheets-Sheet 2
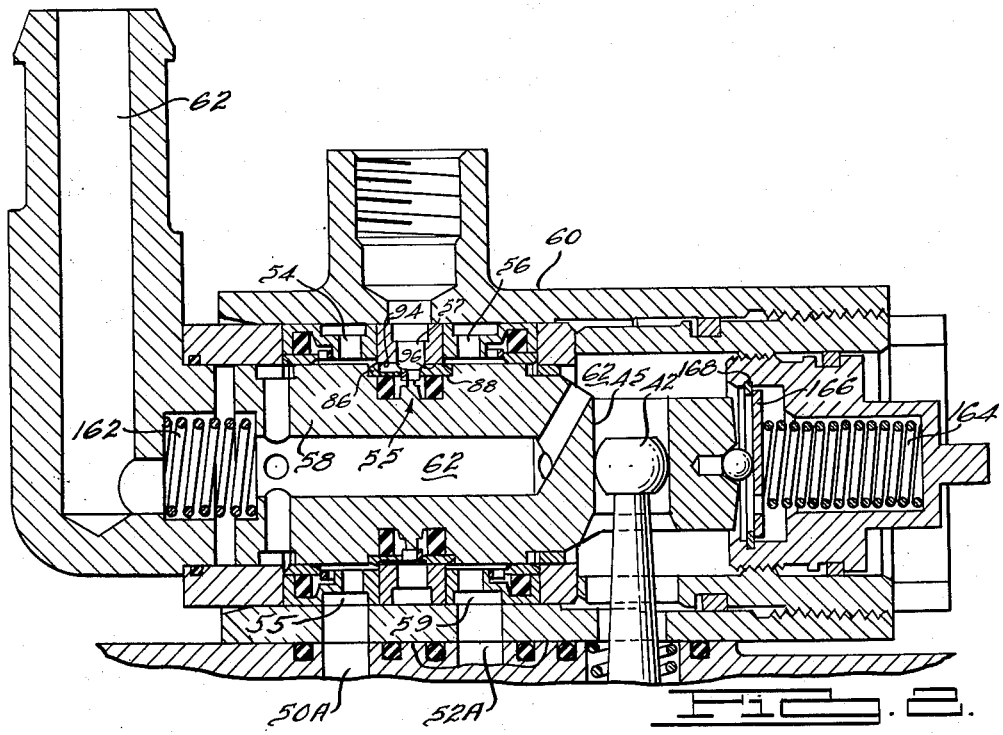
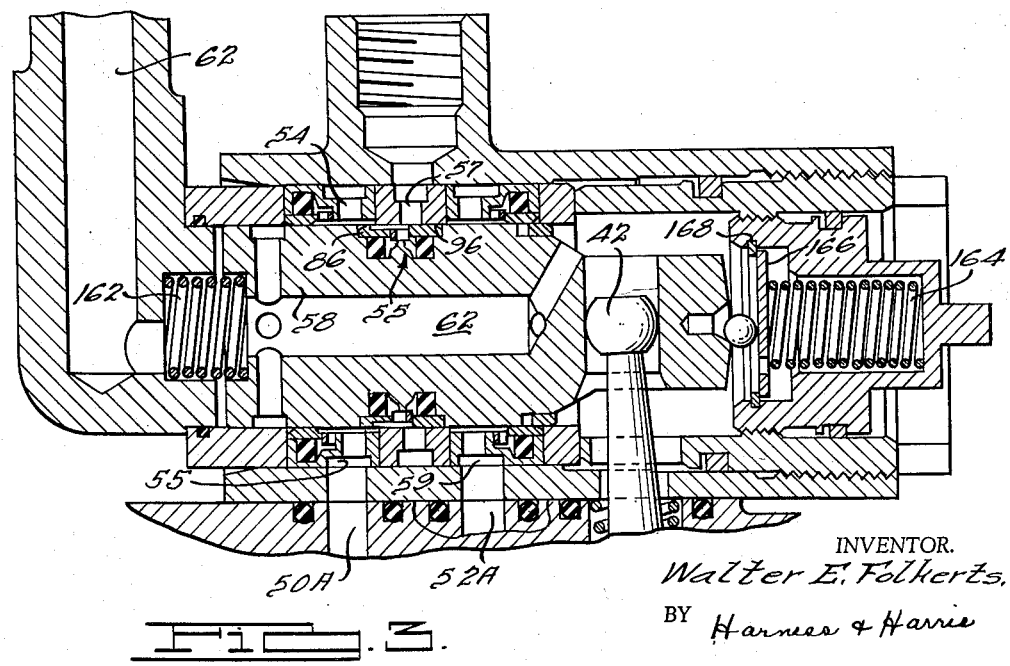
INVENTOR.
Walter E. Folkerts.
BY Harness & Harris
ATTORNEYS.

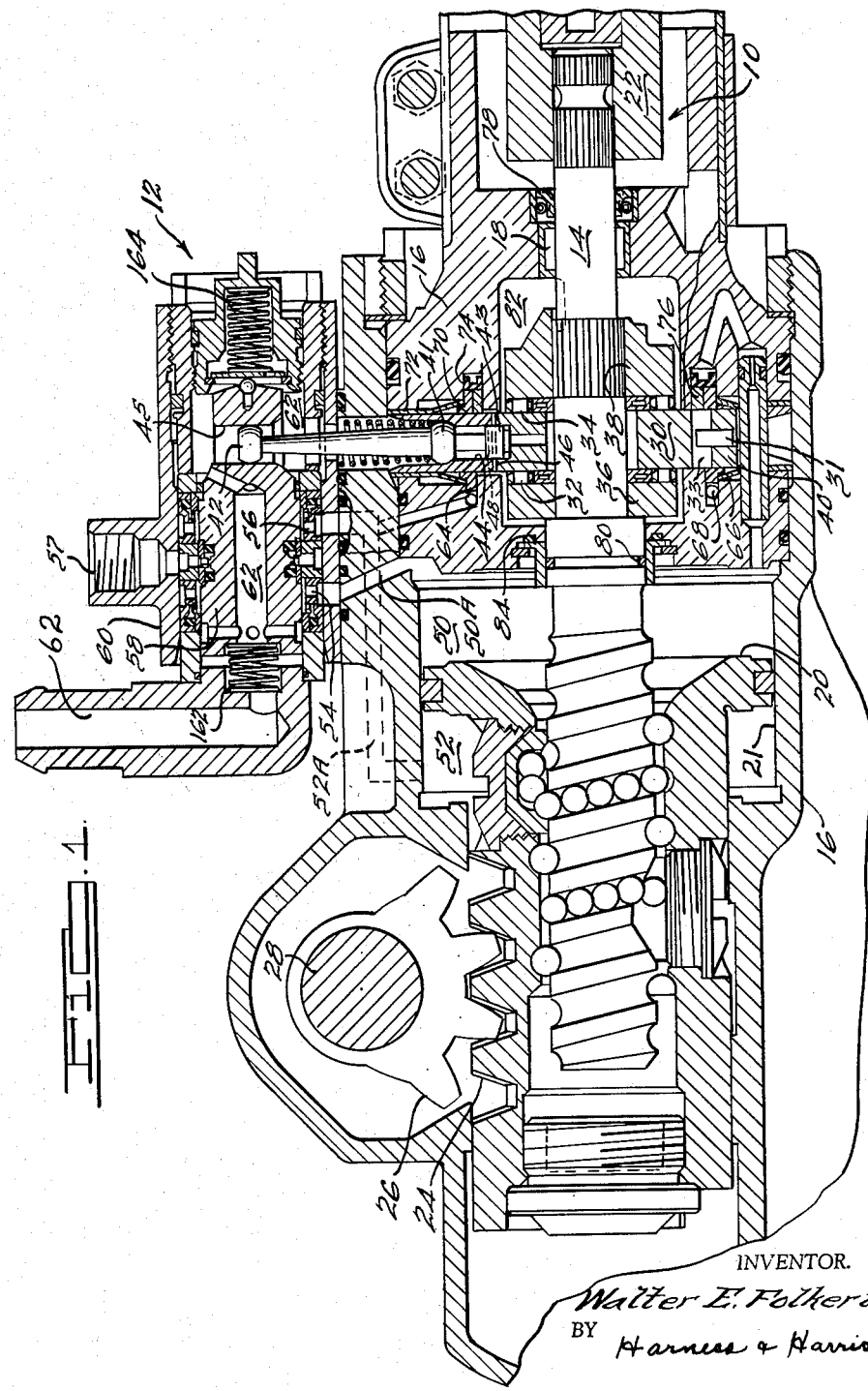

March 7, 1961 W. E. FOLKERTS 2,973,747
EXPANSIBLE RING SEAL VALVE
Filed Dec. 31, 1958 3 Sheets-Sheet 3
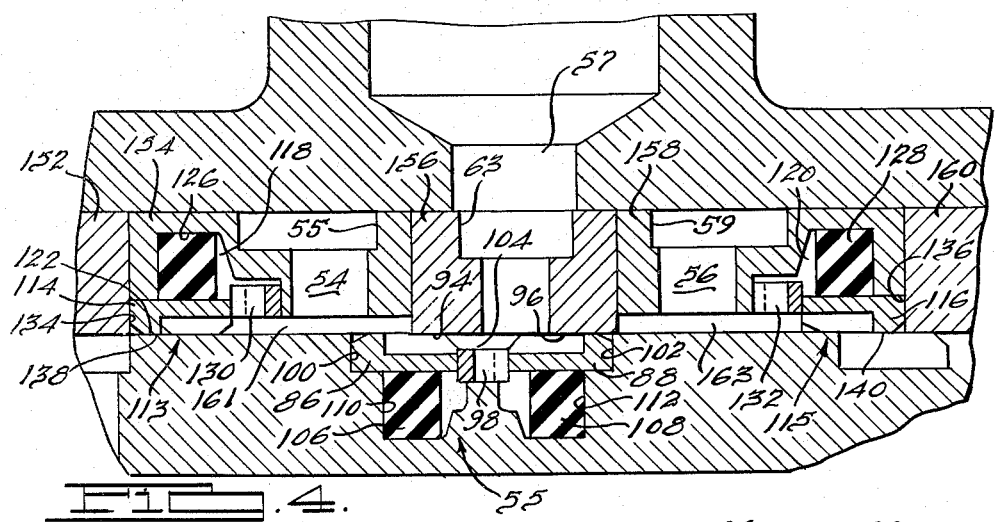
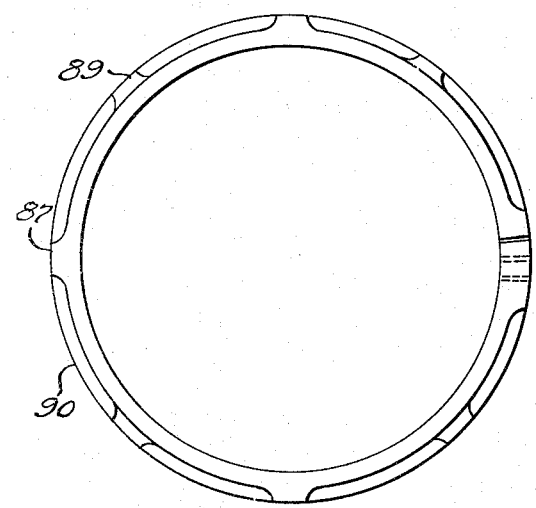
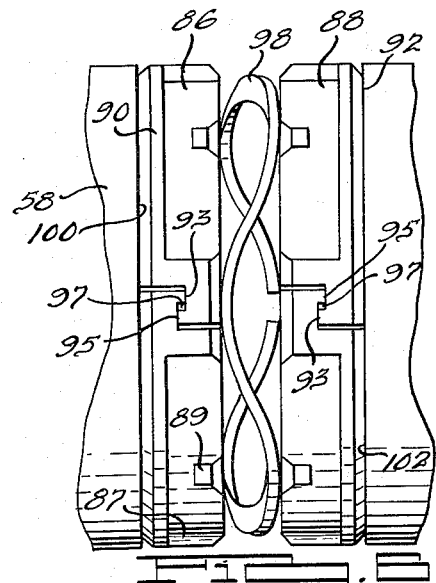
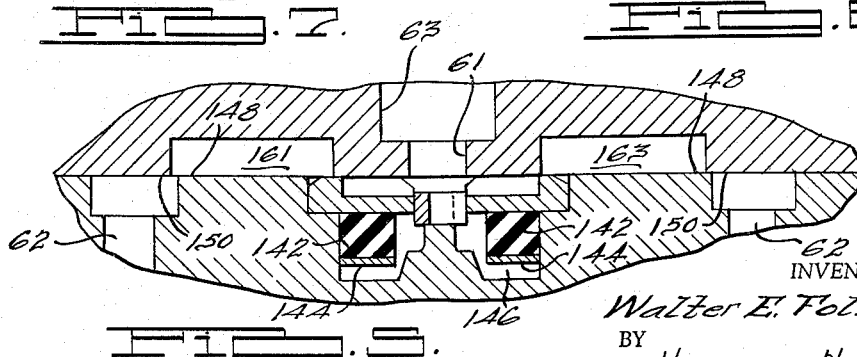
INVENTOR.
Walter E. Folkerts.
BY
Harness & Harris.
ATTORNEYS.

United States Patent Office 2,973,747
Patented Mar. 7, 1961

2,973,747

EXPANSIBLE RING SEAL VALVE

Walter E. Folkerts, Hazel Park, Mich., assignor to Chrysler Corporation, Highland Park, Mich., a corporation of Delaware Filed Dec. 31, 1958, Ser. No. 784,366

13 Claims. (Cl. 121—46.5)

This invention relates to a power steering system for use in vehicles such as automotive conveyances, and relates in particular to a novel type fluid flow control valve for regulating the fluid flow through said system.

In power steering systems of the type conventionally used on automobiles a pressure cylinder is provided having a fluid pressure reaction piston therein operatively linked to the steering column on one side thereof and the front wheels on the other. A source of pressurized fluid such as a fluid accumulator fed by a fluid pump supplies fluid under pressure to a flow control valve which is also linked to the steering column and which reacts to movement thereof to allow fluid to flow selectively into one side of the cylinder and discharge from the other side to cause movement of the piston and the wheels linked thereto. These flow control valves conventionally consist of a hollow body having a core slidably mounted therein wherein the core is operatively linked to the steering column to move in a selective direction with respect to the body in response to movement of the steering wheel. The body and the core have mating lands thereon for slidably and selectively engaging each other at different relative positions to selectively create fluid seals and regulate the fluid flow to either side of the piston. These lands must be precision machined or lapped to create good seals for retaining the pressurized fluid.

It is a major object of this invention to provide a fluid porting means for use in place of the lapped lands of fluid flow control valves and in particular power steering valves to simplify the machining operations required to produce the valve. This porting means is provided with a pressure responsive resilient back up member or seal which communicates with a fluid pressure source and urges porting faces carried by the seal into sealing engagement with cooperating porting seats on the valve.

Another object is to provide a closed center power steering valve with leakproof porting means to prevent loss of accumulator pressure by leakage past the center ports during closed center steering conditions, and to thereby decrease the load on the pump and maintain the fluid at cool temperature.

A further object is to provide a simplified closed center valve structure for an automotive power steering mechanism, said valve having an economical segmented structure adapted for close tolerance production and arranged to achieve a superior fluid discharge system.

Further objects will become apparent from the following description and drawings in which:

Fig. 1 represents a longitudinal mid-sectional view of a power steering unit embodying the present invention;

Fig. 2 represents an enlarged sectional view of the power steering valve of Fig. 1 in a closed center position;

Fig. 3 represents an enlarged sectional view of the valve of Fig. 2 in a working port charging position;

Fig. 4 represents an enlarged sectional view of the porting structure of the power steering valve;

Fig. 5 represents a variation of the porting structure of Fig. 4;

Fig. 6 represents a plan view of the center portion structure of Fig. 4; and

Fig. 7 represents a side view of a porting ring.

Referring to Fig. 1, the power steering unit comprises a power steering worm assembly 10 and a power steering valve 12. The worm assembly 10 consists of a worm shaft 14 journaled in housing 16 at one end by needle bearing 18 and journaled at its other end in piston 20 slidably mounted in fluid cylinder 21 formed in housing 16. Coupling 22 splined to shaft 14 is adapted for connection to the steering column of a vehicle to cause shaft 14 to rotate in response to movement of the steering wheel. Teeth 24 on piston 20 mesh with teeth 26 on a steering tie rod 28, whereby movement of the piston in the cylinder 21 caused by rotation of shaft 14 will rotate rod 28 and effect steering movement of the vehicle wheels which are connected thereto.

A thrust member 30 is rotatably mounted on worm shaft 14 by bearings 32 and 34 and lock collets 36 and 38. A stationary member 40 surrounding and slidably receiving thrust member 30 pivotally receives bearing portion 41 of a valve actuating post 42. Pin 31 secured in member 40 is slidably received in slot 33 in member 30 and prevents relative rotation of these members while allowing relative longitudinal motion. A stem portion 43 of post 42 projects into a cavity 44 in thrust member 30 and is prevented from rotating therein by means of a pin 46 secured in member 30 and extending through slot 48 in portion 43 and frictionally but movably engaging the sides of said slot 48 to allow rocking motion of post 42. Movement of shaft 14 either to the right or to the left of Figure 1 by threading the same in or out of piston 20 will also cause thrust member 30 to move slightly and exert a force on portion 43 of post 42 tending to rock said post about bearing portion 41 for actuating the power steering valve described below.

Referring further to Figure 1, fluid chambers 50 and 52 are connected to working ports 54 and 56 respectively of valve 12 through passages 50A and 52A respectively. These working ports are selectively opened to the fluid inlet 57 by movement of actuating post 42 into contact with the sides of aperture 45 in valve core 58, which contact moves the valve core 58 relative to the valve body 60. Simultaneously with the selective opening of either one of the working ports to inlet 57, the other working port is opened to the low pressure fluid discharge passage generally indicated as 62 to create thereby a pressure drop across the piston 20 in a selected direction and urge said piston toward the chamber of lowest pressure. This urging of piston 20 reduces the turning force on the worm shaft 14 necessary to cause relative movement of the piston and shaft, and necessary to rotate the tie rod 28 to turn the wheels connected thereto for steering of the vehicle.

Referring further to Fig. 1, reaction ring 64 is slidably mounted in a groove in housing 16 and abuts stationary member 40 against which it is urged by spring 66 and seal 68 communicating with working port 56. When chamber 50 is at high pressure and chamber 52 is at low pressure due to the shifting of core 58 to the left (see Figure 3) thrust member 30 is urged against ring 64 to move the same against the reaction pressure of reaction spring 66 and the discharge fluid in port 56 and passage 62 connected thereto to transmit road feel through the worm shaft to the steering wheel. Similarly, a reaction ring 70, reaction spring 72, and resilient seal 74 are positioned on the opposite side of member 30 to transmit road feel to the steering wheel when the pressure differential across piston 20 is reversed in direction. The larger seal 74 and an additional reaction ring 76 adjacent ring 70 are provided to compensate for the unbalanced fluid pressure exerted on the left end of shaft 14.

A seal 78 on shaft 14 at the coupling end of the housing cavity 82 prevents the loss from the system of hydraulic fluid leaking into cavity 82 past the reaction ring seals 68 and 74 and/or past the sealing rings 80 and 84. Fluid in cavity 82 is returned to the fluid pump through passage 62 which extends past actuating post 42 to connect with cavity 82.

The specific structure and operation of the valve 12 are illustrated in Figs. 2 and 3. In Fig. 2 the valve core 58 is shown in a dead center or closed center position with respect to the valve body 60. At such a position the annular fluid inlet 57 in the valve body is isolated from both of the working ports 54 and 56 by a center porting means or structure 55 comprising spaced annular resilient porting rings or elements 86 and 88 respectively. These rings 86 and 88, shown in detail in Figs. 6 and 7, are formed from cast steel in the present instance and have porting faces 90 and 92 respectively which abut porting seats 94 and 96 respectively on opposite sides of fluid inlet 57 to isolate said inlet from ports 54 and 56 when the core is in the closed center position shown in Fig. 2 as aforesaid. A spring 98 urges porting rings 86 and 88 apart and into abutment with shoulders 100 and 102 respectively which partially define a cavity generally designated as 104 in core 58. Rings 86 and 88 are further defined by alternately spaced long and short lands 87 and 89 respectively. The long lands provide bearing surfaces for bearing against seats 94 and 96 when the faces 90 and 92 are disengaged from said seats, thereby to prevent cocking of said rings. The short lands 89 provide additional bearing surfaces for the rings while increasing the effective fluid pressure responsive area of the outer surface of said rings. In this respect, the effective areas of the outer and inner surfaces of the porting rings must be substantially equal in order that resilient sealing rings 106 and 108 described below may exert sufficient forces on the porting rings 86 and 88 respectively to insure good sealing between the porting faces and seats. These porting rings have projections 93 and 95 thereon which may be machined so that either one or both thereof are in sealing abutment with the adjacent portions of the ring when the exterior edges of the rings are in engagement with shoulders 100 and 102 of cavity 104. Spaces 97 between these projections allow for ring wear and resultant radial ring expansion.

The resilient sealing rings 106 and 108 mentioned above are formed from rubber-like material adapted to flow in the manner of a fluid when subject to high pressure. The rings are constantly in communication with fluid inlet 57 via cavity 104 and urge rings 86 and 88 respectively toward porting seats 94 and 96. The sealing rings 106 and 108 are initially made oversized and when assembled are consequently held under compression between rings 86 and 88 and the bottom of cavity 104. Since the pressure developed by the hydraulic fluid on the top of rings 86 and 88 is at all times equal to the fluid pressure on the rings 106 and 108 there is no net force on the rings 86 and 88 tending to urge them away from seats 94 and 96. However, when the valve core is in the dead center or non steering position as shown in Figure 2 a pressure differential exists between cavity 104 and each of the working ports 56 and 54 which differential tends to force the rings 106 and 108 tightly against the bottom of rings 86 and 88, urging them toward the porting seats and against the side portions 110 and 112 of cavity 104 to create a fluid tight seal isolating the working ports from the inlet fluid. It is seen that no precision fitting of the porting faces and porting seats is required since the resilient sealing rings 106 and 108 impart continuous and automatic sealing force to the porting rings 86 and 88.

Fluid discharge porting means 113 and 115 comprise annular porting rings 114 and 116, similar to annular rings 86 and 88, secured in annular cavities 118 and 120 in the valve body. The rings 114 and 116 are urged toward annular porting seats 122 and 124 respectively on the valve core by resilient flowable annular sealing rings 126 and 128 similar to rings 106 and 108. Also similar in construction to annular spring 98 are annular springs 130 and 132 which continuously urge annular rings 114 and 116 into contact with shoulders 134 and 136 respectively. Annular porting means 113 and 115 are operative in an identical manner to the annular center porting means 55 to selectively form fluid tight seals between the annular faces 138 and 140 of porting rings 114 and 116 respectively and the porting seats 122 and 124 on the valve core.

In Fig. 5 is shown a variation in the structure of the resilient sealing rings of the valve 12, wherein resilient flowable sealing rings 142, similar to rings 106 and 108, do not abut the bottom of cavity 104 but are urged against the inner surface of the porting rings by radially expansible springs 144. The spaces 146 between these springs and the bottom of cavity 104 are in constant communication with the inlet fluid pressure which urges the sealing rings into sealing contact with the porting rings and the side walls of cavity 104 due to the pressure drop between cavity 104 and the working ports 54 and 56. Also shown in the variation of Fig. 5, the discharge porting means consists of lapped surfaces 148 and 150. In actual use of the valve, the discharge porting means do not require the leakproof seals of Figure 4 since during the greater period of normal driving time the discharge ports are open to the fluid discharge system and when the discharge ports are closed to assist in steering, slight leakage of the fluid is unnoticeable. The center porting means must be practically leakproof to avoid draining the fluid accumulator of its pressure when the power steering mechanism is inactive such as occurs during straight ahead steering and when the vehicle engine is not running and the hydraulic pump which charges the accumulator is not operating.

Referring to Fig. 4, the specific structure of the valve is shown to be a series of annular insert rings 152, 154, 156, 158 and 160 stacked in abutting relationship in body 60. Rings 152 and 160 are shoulder inserts, rings 154 and 158 are seal retaining inserts, and ring 156 is a porting slot and fluid inlet insert. Rings 154 and 158 provide convenient means into which the working ports 54 and 56 respectively may be formed in spaced arrangement about the core. Annular grooves 55 and 59 in rings 154 and 158 provide means to convey the working fluid to the passages 50A and 52A respectively communicating with opposite sides of the steering piston 20. The shoulder inserts 152 and 160 and the insert ring 156 having spaced apertures 61 and connected annular groove 63, extend into the base further than inserts 154 and 158 to provide annular cavities 161 and 163 which provide fluid passages connecting the fluid inlet 57 to the working ports and the working ports to the discharge system. The valve structure is simplified by this particular type of insert construction and the operation of the valve is rendered extremely accurate since each of the inserts and the grooves and cavities therein can be machined individually and rapidly to close tolerances. Moreover, the replacement of worn parts is also simplified by this insert construction.

Referring to Figs. 2 and 3, the valve core 58 is urged at all times toward its dead center position by centering springs 162 and 164 located at opposite ends of the valve. Spring 162 is preferably of about 5 pounds strength and urges the core 58 against a movable plate 166 which is urged against a stop 168 by spring 164 which is preferably of about 10 pounds strength. In this manner the core is constantly urged to its exact closed center position. The strength of centering springs 162 and 164, of reaction springs 66 and 72, and of the reaction pressure on seals 68 and 74 determines the resistance to steering, or road feel experienced by the vehicle operator.

I claim:

1. In a power steering fluid control valve having two relatively movable members, a fluid inlet in one of said members communicating with a source of pressurized fluid, and a working port in said one member on either side of said inlet, closed center valve means carried jointly by said members for selectively connecting at different relative positions of said members each said working port with said inlet and also for simultaneously disconnecting at another relative position both said working ports from said inlet, said valve means comprising a seat on said one member extending to each side of said inlet, a groove in the other of said members facing substantially toward said seats, said groove being partially defined by shoulder means on either side thereof, a porting element for cooperating with each of said seats, each of said elements abutting one each of said shoulder means and being resiliently urged thereagainst, passage means connecting said groove with said fluid inlet, and resilient flowable sealing means in said groove held under compression by said porting elements and said fluid and urging said elements against their respective seats.

2. A fluid flow control valve comprising a body having a bore therein, a fluid inlet in said body communicating with said bore and with a source of pressurized fluid, annular seats in said bore on either side of said inlet, a valve core slidably mounted in said bore and defining with said body a working port on each side of said inlet, closed center porting means carried by said core and cooperable with said annular seats at one relative position of said body and core to selectively connect either of said working ports with said inlet and at another relative position to simultaneously disconnect both said working ports from said inlet, said porting means comprising an annular groove in said core having shoulder means on either side thereof, porting elements in said groove having portions resiliently urged into contact with said shoulder means, porting faces spaced on said porting elements, resilient flowable sealing means in said groove compressed between said porting elements and portions of said groove and urging said faces toward said annular seats, and passage means connecting said sealing means with said pressurized fluid.

3. A fluid flow control valve comprising a body having a bore therein, a fluid inlet in said body communicating with said bore and pressurized fluid, annular seats in said bore on either side of said inlet, a valve core slidably mounted in said bore and defining with said body a working port on each side of said inlet, porting means carried by said core and cooperable with said annular seats at one relative position of said body and core to selectively connect either of said working ports with said inlet and at another position to simultaneously disconnect both said working ports from said inlet, said porting means comprising an annular groove in said core having shoulder means on either side thereof, an annular porting ring adjacent each side of said groove, spring means interposed between said rings urging them apart and into contact with said shoulder means, a porting face on the top of each said ring adjacent an edge thereof, spaced fluid passage slots in each said ring extending from said sealing faces to the opposite edges of said rings and defining spaced lands flush with said faces, resilient flowable sealing means in said groove compressed between said rings and portions of said groove and urging said faces and lands toward said annular seats, and passage means connecting said sealing means with said pressurized fluid to substantially offset the effect of fluid pressure on the outer surface of each said ring.

4. A fluid valve comprising a body having an annular bore therein, an annular valve member slidably mounted in said bore, an annular fluid inlet in said body, an annular valve seat on each side of said inlet, circumferentially expansible annular porting ring means mounted on said valve member and movable therewith, said porting ring means each having an annular porting face extending therearound and adapted to simultaneously and selectively bear against one each of said valve seats, resilient annular sealing means extending around said valve member adjacent the inner periphery of said porting ring means, said sealing means being adapted to flow under pressure and urge said ring means with said faces thereon against said valve seats to maintain a fluid tight seal therebetween.

5. A fluid valve comprising a body having an annular bore therein, an annular valve member slidably mounted in said bore, an annular fluid inlet in said body, an annular valve seat on each side of said inlet, circumferentially expansible annular porting ring means mounted on said valve member and movable therewith, said porting ring means each having an annular porting face extending therearound and adapted to simultaneously and selectively bear against one each of said valve seats, resilient annular sealing means extending around said valve member adjacent the inner periphery of said porting ring means, said sealing means adapted to urge said ring means and said faces against said valve seats to maintain a fluid tight seal therebetween, first spring means urging said valve member in one direction in said bore, second spring means stronger than said first spring means and urging said valve member in the opposite direction, and stop means limiting the expansion of said second spring means to position said valve member relative to said body.

6. A fluid flow regulating valve comprising two relatively shiftable members defining a chamber, a first seat supporting by one of said members and a first radially expansible face supported by the other of said members jointly defining a variable size working port connecting said chamber and a source of pressurized fluid, a second seat supported by one of said members and a second radially expansible face supported by the other of said members jointly defining a variable size discharge port communicating with said chamber, said first seat and first face being disengagable at one relative position of said members and said second seat and second face being engageable at said one relative position to charge said working port, and resilient means engaging each said face and resiliently urging the same toward its associated seat.

7. A fluid control valve comprising two relatively shiftable members defining a chamber, a source of pressurized fluid, a first seat supported by one of said members, a cavity in the other of said members communicating with said source of pressurized fluid, a resilient seal in said cavity having a portion in communication with said source of pressurized fluid and spaced from the bottom of said cavity, a first face carried by the other of said members and continuously urged toward said seat by said resilient seal, said first seat and first face jointly defining a variable size working port connecting said chamber and said source of pressurized fluid, a second seat supported by one of said members and a second face supported by the other of said members, said second seat and second face jointly defining a variable size discharge port connected with said chamber, said first seat and first face adapted to be disengaged by relative shifting of said members to a selected position to allow fluid to flow into said chamber, and said second seat and second face adapted to be engaged at said selected position to prevent fluid from being discharged from said chamber.

8. A fluid control valve comprising two relatively shiftable members defining a chamber, a source of pressurized fluid, a first seat supported by one of said members, a cavity in the other of said members communicating with said source of pressurized fluid, resilient sealing means in a first portion of said cavity, a first sealing element carried by said sealing means, a first face carried by said element, first portions of said sealing means abutting a wall of said cavity and the underside of said element, second portions of said sealing means being oppositely disposed from said first portions and communicating with said fluid source, said fluid source exerting pressure on said sealing means urging said first portions thereof into sealing engagement with said wall and the underside of said element tending to urge said element and said face toward said first seat, said first seat and first face jointly defining a variable size working port connecting said chamber and said source of pressurized fluid, a second seat supported by one of said members and a second face supported by the other of said members, said second seat and second face jointly defining a variable size discharge port connected with said chamber, said first seat and first face being disengageable by relative shifting of said members to a preselected position to allow fluid to flow into said chamber, and said second seat and second face being engageable at said position to prevent fluid from discharging from said chamber.

9. A fluid flow control valve comprising a body having a bore therein, a core slidably mounted in said bore and defining with said bore an annular chamber intermediate said bore and said core, a fluid pressure source, a fluid inlet connecting said chamber with said fluid source, a working port in said body on either side of said fluid inlet communicating with said chamber, an annular seat on either side of said inlet, an annular cavity in said core communicating with said fluid pressure source, radially expansible annular porting elements frictionally positioned in an outer portion of said cavity, an annular face on each of said porting elements, each of said faces being spaced apart and adapted to slidably engage a predetermined one of said annular seats, resilient sealing means in an inner portion of said cavity engaging said porting elements and urging said faces radially outwardly toward said seats, said sealing means being urged tightly against said porting elements by said fluid pressure source, said seats and said faces being selectively disengageable by selective relative movement of said body and said core to selectively connect said fluid inlet to said working ports.

10. A fluid flow control valve comprising a body having a bore therein, a core slidably mounted in said bore and defining with said bore an annular chamber intermediate said bore and said core, a fluid pressure source, a fluid inlet connecting said chamber with said fluid source, a working port in said body on either side of said fluid inlet communicating with said chamber, an annular seat on either side of said inlet, an annular cavity in said core communicating with said fluid pressure source, radially expansible annular porting elements frictionally positioned in an outer portion of said cavity, an annular face on each of said porting elements, said faces being spaced apart and adapted to slidably engage a respective one of said annular seats, resilient sealing means in an inner portion of said cavity engaging said porting elements and urging them and said faces toward said seats, said sealing means being urged tightly against said sealing elements by said fluid pressure source, said seats and said faces being selectively disengageable by relative movement of said body and said core to selectively connect said fluid inlet to said working ports, a discharge port on each side of said fluid inlet communicating with said chamber and said respective working ports, said discharge ports being defined by cooperating shoulders on said core and said body and being selectively opened by selective relative movement of said core and said body to permit discharge of said fluid from said working ports.

11. A fluid flow control valve comprising a body having a bore therein, a core slidably mounted in said bore defining a chamber between said bore and said core, said body having a fluid inlet connecting a fluid source with said chamber, working ports communicating with said chamber on either side of said fluid inlet, an annular seat on either side of said inlet, a core slidably mounted in said bore and having a cavity therein communicating with said fluid inlet, radially expansible porting means frictionally positioned in said cavity, said porting means having an upper surface, separate faces on edge portions of said upper surface of said porting means, said faces being spaced apart and adapted to slidably engage separate ones of said seats, resilient flowable means compressed between said porting means and said body, said flowable means and said porting means having substantially equal pressure responsive areas, said flowable means urging said faces on said porting means toward said seats, said seats and said faces being selectively engageable by selective relative movement of said body and said core to selectively connect said fluid inlet to said chamber and to said working ports on either side of said inlet.

12. A fluid flow control valve comprising a body having a bore therein, said body having a fluid inlet communicating with a source of fluid, a core slidably mounted in said bore defining a chamber between said bore and said core on each side of said inlet, a working port communicating with each said chamber, means forming an annular seat on each side of said inlet, said core having a cavity therein, radially expansible porting means positioned in said cavity and having faces spaced axially of said bore, said faces being adapted to simultaneously, selectively engage said seats to effect a seal between said inlet and each of said chambers, said porting means also having circumferentially spaced guide lands flush with said faces in bearing contact with said seats, said lands and said faces defining circumferentially spaced fluid passages in communication with said inlet, resilient flowable sealing means compressed between said porting means and said body and urging said faces toward said seats, means connecting said sealing means with said fluid inlet, the outer circumferential area of said porting means in communication with said fluid inlet being approximately equal to the inner circumferential area of said porting means in communication with said sealing means and with said fluid source when the associated face and seat are in sealing engagement to thereby approximately hydraulically balance said porting means.

13. A fluid flow regulating valve comprising a body having a bore therein, a fluid feed port in said body communicating with said bore and with a source of pressurized fluid, a first annular sealing seat on said body on each side of said feed port, a fluid discharge passage in said body communicating with said bore, a working port in said body on each side of said feed port and communicating with said bore, a valve core slidably mounted in said bore, first radially expansible, spaced annular porting faces carried by said core and simultaneously engageable with said first sealing seats to completely close said feed port at a first position of said core, a second annular porting face on said body on either side of said feed port associated with each of said working ports, and second annular sealing seats carried by said core and adapted to selectively engage each of said second porting faces on said body by movement of said core in a selective direction from said first position, said selective movement also disengaging one of the first sealing seats and its associated first porting face to open said feed port to allow a fluid flow into the selected working port.

References Cited in the file of this patent
UNITED STATES PATENTS

| | | |
|---|---|---|
| 2,710,596 | Folkerts | June 14, 1955 |
| 2,788,770 | Folkerts | Apr. 16, 1957 |
| 2,879,748 | Banker | Mar. 31, 1959 |